United States Patent
Korzhenko et al.

(10) Patent No.: US 10,446,831 B2
(45) Date of Patent: Oct. 15, 2019

(54) ACTIVE ELECTRODE MATERIAL FOR A LI—S BATTERY

(71) Applicant: Arkema France, Colombes (FR)

(72) Inventors: Alexander Korzhenko, Pau (FR); Christophe Vincendeau, Lons (FR)

(73) Assignee: Arkema France, Colombes (FR)

( * ) Notice: Subject to any disclaimer, the term of this patent is extended or adjusted under 35 U.S.C. 154(b) by 223 days.

(21) Appl. No.: 15/538,030

(22) PCT Filed: Dec. 21, 2015

(86) PCT No.: PCT/FR2015/053682
§ 371 (c)(1),
(2) Date: Jun. 20, 2017

(87) PCT Pub. No.: WO2016/102865
PCT Pub. Date: Jun. 30, 2016

(65) Prior Publication Data
US 2017/0352873 A1    Dec. 7, 2017

(30) Foreign Application Priority Data

Dec. 22, 2014  (FR) ..................................... 14 63052

(51) Int. Cl.
*H01M 4/136* (2010.01)
*H01M 4/36* (2006.01)
(Continued)

(52) U.S. Cl.
CPC .......... *H01M 4/136* (2013.01); *H01M 4/364* (2013.01); *H01M 4/5815* (2013.01);
(Continued)

(58) Field of Classification Search
CPC ..... H01M 4/136; H01M 4/5815; H01M 4/364
See application file for complete search history.

(56) References Cited

U.S. PATENT DOCUMENTS

2012/0119158 A1 * 5/2012 Barchasz ............ C01B 17/0248
252/502
2013/0161557 A1    6/2013 Chung
(Continued)

FOREIGN PATENT DOCUMENTS

CN    102 142 554    8/2011
CN    103 247 799    8/2013
(Continued)

OTHER PUBLICATIONS

International Search Report dated Mar. 1, 2016 for PCT/FR2015/053682.
(Continued)

*Primary Examiner* — Stewart A Fraser
(74) *Attorney, Agent, or Firm* — NK Patent Law

(57) ABSTRACT

The present invention relates to an active material suitable for the production of an electrode, in particular an electrode for a Li—S battery. The active material according to the invention comprises carbon nanofillers homogeneously dispersed in the substance of a sulphur material, the active material being obtainable according to a method involving melting in the presence of intense mechanical energy. The quantity of carbon nanofillers in the active material represents 1 to 25% by weight with respect to the total weight of the active material. The active material according to the invention allows an improvement in the electronic conductivity of the formulation of the electrode. Another aspect of the invention is the use of the active material in an electrode, in particular in a Li—S battery cathode.

20 Claims, 1 Drawing Sheet

(51) Int. Cl.
*H01M 4/58* (2010.01)
*H01M 4/1397* (2010.01)
*H01M 4/60* (2006.01)
*H01M 4/62* (2006.01)
*H01M 10/052* (2010.01)
*H01M 4/02* (2006.01)

(52) U.S. Cl.
CPC ............ *H01M 4/1397* (2013.01); *H01M 4/60* (2013.01); *H01M 4/625* (2013.01); *H01M 10/052* (2013.01); *H01M 2004/021* (2013.01); *H01M 2004/028* (2013.01)

(56) References Cited

U.S. PATENT DOCUMENTS

| | | | | |
|---|---|---|---|---|
| 2015/0118525 | A1* | 4/2015 | Zheng | H01M 10/425 429/52 |
| 2015/0340688 | A1* | 11/2015 | Rhee | H01M 4/625 429/231.4 |

FOREIGN PATENT DOCUMENTS

| | | |
|---|---|---|
| FR | 2 948 233 | 1/2011 |
| WO | WO-2013/155038 | 10/2013 |

OTHER PUBLICATIONS

Database Accession No. CN-201110039005-A dated Aug. 3, 2011.
Database Accession No. CN-201210023158-A dated Aug. 14, 2013.
Zheng et al., "Novel Nanosized Adsorbing Sulfur Composite Cathode Materials for the Advanced Secondary Lithium Batteries," *Electrochemica Acta*, Aug. 2, 2005, vol. 51, No. 7, pp. 1330-1335.

\* cited by examiner

ACTIVE ELECTRODE MATERIAL FOR A LI—S BATTERY

CROSS-REFERENCE TO RELATED APPLICATIONS

This application is a U.S. National Stage application of International Application No. PCT/FR2015/053682, filed Dec. 21, 2015, which claims the benefit of French Application No. 1463052, filed Dec. 22, 2014.

TECHNICAL FIELD

The present invention relates to the field of Li/S batteries. More particularly, the invention relates to an active material for the manufacture of an electrode, comprising carbon-based nanofillers homogeneously dispersed in the body of a sulfur-based material, it being possible for the active material to be obtained according to a process by the molten route.

STATE OF THE ART

A lithium/sulfur battery (subsequently referred to as Li/S battery) consists of a positive electrode (cathode) of elemental sulfur or of another electroactive sulfur-based material, of a negative electrode (anode) formed of lithium metal or of a lithium-based metal alloy, and also of an organic liquid electrolyte.

Typically, the positive electrode is prepared from an active material comprising elemental sulfur Ss (subsequently denoted native sulfur) and optionally different additives which is mixed with a solvent and a binder, thus forming a paste, which is applied to a current collector and then dried in order to remove the solvent. The composite structure formed is optionally subjected to a compression stage and then cut to the desired size of the cathode.

The Li/S battery is obtained by depositing a separator on the cathode and then a lithium anode is deposited on the separator. An electrolyte, generally comprising at least one lithium salt dissolved in a solvent, is subsequently introduced into the battery.

Li/S batteries have formed the subject of numerous research studies since the 2000s and are sensed as promising alternatives to conventional Li-ion batteries. The advantage of this type of battery comes from the high bulk storage capacity of the sulfur electrode, making it possible to achieve energy densities which can range up to 500 Wh·kg$^{-1}$. In addition, native sulfur exhibits the not insignificant advantages of being abundant, of low cost and nontoxic, which makes it possible to envisage the development of Li/S batteries on a large scale.

The mechanism for discharging and charging a Li/S battery is based on the reduction/oxidation of the sulfur at the cathode ($S+2e^- \leftrightarrow S^{2-}$) and the oxidation/reduction of the lithium at the anode ($Li \leftrightarrow Li^+ + e^-$).

During discharging, the sulfur molecules Ss are reduced and form lithium polysulfide chains, of general formula $Li_2S_n$ (n≥2), dissolved in the organic electrolyte. The final stage of reduction of the sulfur consists of the formation of lithium sulfide $Li_2S$, which precipitates from the organic electrolyte and is deposited on the anode. The reverse electrochemical reactions take place in charging.

In order to allow the electrochemical reactions to take place rapidly at the electrodes, the cathode and the anode have to overall be good electron conductors. In point of fact, as sulfur is an electron insulator ($\sigma = 5 \cdot 10^{-30}$ S·cm$^{-1}$ at 25° C.), the discharge rates are relatively slow.

Various improvement routes targeted at overcoming this low electron conductivity of the active material are envisaged, in particular the addition of an electron-conducting additive, such as a carbon-based conductive material. However, the kinetics of reaction at the cathode remain limited if the sulfur/additive mixture is not optimal or if the content of additive is too low.

Among conductive additives, carbon black, activated carbon, carbon fibers or carbon nanotubes are generally employed. Carbon black is conventionally used.

The mixing of the active material and of the conductive additive can be carried out in various ways.

For example, the mixing can be carried out directly during the preparation of the electrode. The sulfur is then mixed with the conductive additive and the binder by mechanical stirring, before shaping the electrode. By virtue of this homogenization stage, the carbon-based additive is assumed to be distributed around the sulfur particles, and thus creates a percolating network. A grinding stage can also be employed and makes it possible to obtain a more intimate mixing of the materials. However, this additional stage can bring about destruction of the porosity of the electrode.

Another way of mixing the active material with the carbon-based additive consists in grinding the sulfur and the carbon-based additive by the dry route, so as to coat the sulfur with carbon.

From the same viewpoint, the carbon can be deposited around the sulfur particles by deposition in the vapor phase. Conversely, a core-shell structure can also be prepared from carbon black, on which a layer of sulfur is deposited, for example by precipitation of the sulfur on carbon black nanoparticles.

By way of example, in the document FR 2 948 233, a description is given of a conductive composite material obtained from a chemical treatment of sulfur and carbon, which are introduced into a sealed reactor without external regulation of the pressure within the reactor, at a temperature of between 115° C. and 400° C., for a sufficient amount of time to cause the sulfur to melt and an equilibrium to be reached. This material exists in the form of sulfur particles covered with carbon exhibiting a low specific surface. However, the process for introducing carbon into sulfur, described in this document, is only applicable to carbon-based nanofillers without form factor or aggregation, and does not result in carbon-based nanofillers homogeneously dispersed in the body of the sulfur.

The document US 2013/0161557 describes a process for the preparation of an electrode active material for a rare earth lithium-sulfur battery. The process results in a composite material comprising molten sulfur absorbed in carbon nanotubes at high temperature and under vacuum. This composite material is subsequently subjected to different treatments, including dissolution in an alcohol, grinding, drying and calcination, so as to form an electrode active material. The process described in this document is relatively complex to carry out.

Unlike carbon black, the additives of carbon nanotube (CNT) type exhibit the advantage of also conferring an adsorbent effect beneficial for the active material by limiting its dissolution in the electrolyte and thus promoting better cyclability.

For example, in the paper Electrochimica Acta, 51 (2006), pp 133-1335, Zheng W. et al. describes the preparation of a sulfur/carbon nanotubes (CNTs) composite material by melt blending at high temperature for a long residence time.

However, the cycling tests carried out with this material were carried out only over 60 cycles, which does not make it possible to show that the carbon nanotubes are indeed homogeneously dispersed in the body of the sulfur in order to obtain an effect over the lifetime of the electrode.

The introduction of CNTs into the formulations constituting the electrodes also raises many problems. This is because CNTs prove to be difficult to handle and to disperse, due to their small size, to their pulverulence and possibly, when they are obtained by chemical vapor deposition (CVD), to their entangled structure furthermore generating strong Van Der Waals interactions between their molecules. The low dispersion of the CNTs limits the effectiveness of the charge transfer between the positive electrode and the electrolyte and thus the performance of the Li/S battery, despite the addition of the conductive material.

This is why it would be advantageous for the formulator to have available an active material comprising CNTs which are well dispersed in sulfur, and more generally in a sulfur-based material, in the form of a ready-for-use active material, which can be used directly in a formulation for the manufacture of an electrode for a Li/S battery for the purpose of effectively increasing is electron conductivity.

The applicant company has now found that an active material comprising carbon nanotubes homogeneously dispersed in the body of a sulfur-based material, such as sulfur, makes it possible to increase the conductive fillers/sulfur interfaces and thus to increase the charge and discharge capacity of the battery incorporating this active material.

The applicant company has also discovered that this active material can be obtained by bringing CNTs into contact with a sulfur-based material by the molten route, for example in a compounding device, thus forming an improved active material which can be used for the preparation of an electrode.

It has furthermore become apparent that this invention can also be applied to carbon-based nanofillers other than CNTs, in particular to carbon nanofibers and to graphene, or their mixtures in all proportions.

SUMMARY OF THE INVENTION

A subject matter of the invention is an active material for the manufacture of an electrode, comprising:
  a sulfur-based material;
  from 1 to 25% by weight of carbon-based nanofillers homogeneously dispersed in the body of the sulfur-based material.

According to one embodiment, the electrode active material comprises from 5 to 25% by weight of carbon-based nanofillers homogeneously dispersed in the body of the sulfur-based material.

Another subject matter of the invention is an electrode active material, comprising:
  a sulfur-based material;
  from 1 to 25% by weight of carbon-based nanofillers homogeneously dispersed in the body of the sulfur-based material,
characterized in that it exhibits a porosity of less than 40%.

Another subject matter of the invention is an electrode active material, comprising:
  a sulfur-based material;
  from 1 to 25% by weight of carbon-based nanofillers homogeneously dispersed in the body of the sulfur-based material,
characterized in that it exhibits a density of greater than 1.6 g/cm$^3$.

According to one embodiment of the invention, said active material is obtained by the molten route, in particular with a mechanical energy which can be between 0.05 kWh and 1 kWh per kg of active material, preferably between 0.2 and 0.5 kWh/kg of active material.

"Carbon-based nanofiller" denotes a carbon-based filler, the smallest dimension of which is between 0.1 and 200 nm, preferably between 0.1 and 160 nm and more preferably between 0.1 and 50 nm, measured by light scattering.

"Carbon-based nanofiller" can denote a filler comprising at least one component from the group formed of carbon nanotubes, carbon nanofibers and graphene, or a mixture of these in all proportions. Preferably, the carbon-based nanofillers comprise at least carbon nanotubes.

"Sulfur-based material" is understood to mean a sulfur-donating compound chosen from native (or elemental) sulfur, sulfur-based organic compounds or polymers and sulfur-based inorganic compounds.

According to a preferred embodiment of the invention, the sulfur-based material comprises at least native sulfur, the sulfur-based material being native sulfur alone or as a mixture with at least one other sulfur-based material.

The active material according to the invention comprises carbon-based nanofillers well percolated into a molten sulfur-based matrix, and the carbon-based nanofillers are homogeneously distributed throughout the body of the sulfur-based material, which can be visualized, for example, by electron microscopy. The sulfur-based material/nanofiller mixture has a morphology suited to optimization of the functioning of a Li/S battery electrode.

The active material according to the invention can thus provide an efficient transfer of electricity from the current collector of the electrode and offer active interfaces to the electrochemical reactions during the operation of the battery.

Thus, the present invention provides an active material exhibiting a better combination of a sulfur-donoting material with particles of carbon-based nanofillers in order to facilitate access of the sulfur to the electrochemical reactions. In addition, the electron incorporating the active material according to the invention provides good maintenance of the operation of the battery over time.

According to one embodiment of the invention, the active material additionally comprises at least one additive chosen from a rheology modifier, a binder, an ion conductor, a carbon-based electrical conductor, an electron-donating component or their combination. Just like carbon-based nanofillers, the additive/additives are incorporated in the material by the molten route.

Another aspect of the invention is the use of the active material as described above in an electrode, in particular in a Li/S battery cathode. The active material according to the invention makes it possible to improve the electron conductivity of the formulation of the electrode.

DETAILED DESCRIPTION OF THE INVENTION

Figure 1:
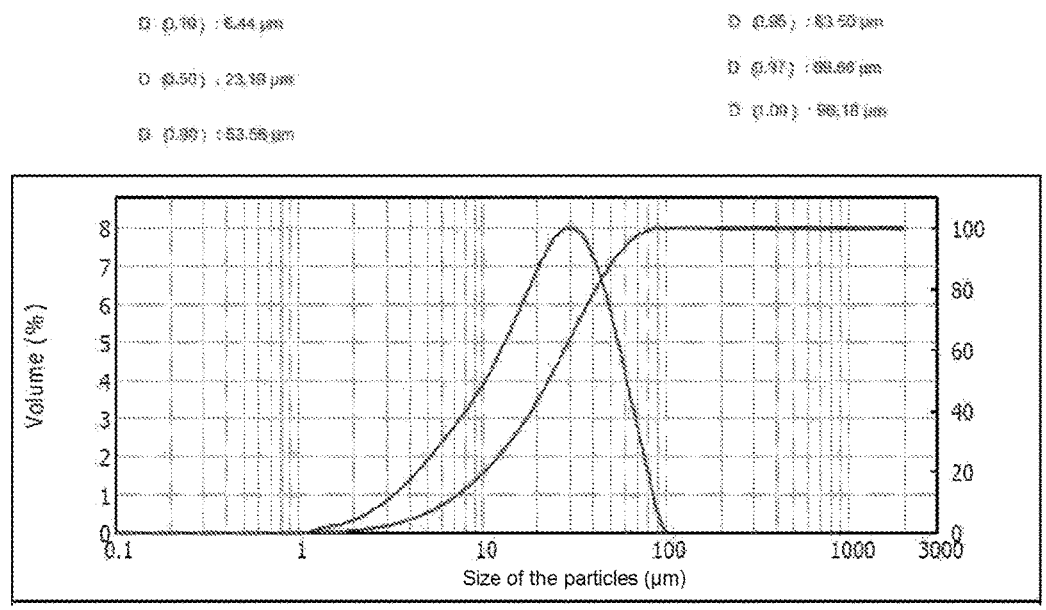
FIG. 1 represents the particle size distribution of the powder obtained in example 1 according to the invention.

The invention is now described in greater detail and nonlimitingly in the description which follows.

The Carbon-Based Nanofillers

According to the invention, the carbon-based nanofillers can be carbon nanotubes, carbon nanofibers, graphene or a mixture of these in all proportions. The carbon-based nanofillers are preferably carbon nanotubes, alone or in a mixture with at least one other carbon-based nanofiller.

The carbon nanotubes (CNTs) participating in the composition of the active material can be of the single-walled, double-walled or multi-walled type, preferably of the multi-walled-type (MWNT).

The carbon nanotubes employed according to the invention usually have a mean diameter ranging from 0.1 to 200 nm, preferably from 0.1 to 100 nm, more preferably from 0.4 to 50 nm and better still from 1 to 30 nm, indeed even from 10 to 15 nm, and advantageously have a length of more than 0.1 µm and advantageously from 0.1 to 20 µm, preferably from 0.1 to 10 µm, for example of approximately 6 µm. Their length/diameter ratio is advantageously greater than 10 and generally greater than 100. Their specific surface is, for example, between 100 and 300 $m^2/g$, advantageously between 200 and 300 $m^2/g$, and their apparent density can in particular be between 0.01 and 0.5 $g/cm^3$ and more preferably between 0.07 and 0.2 $g/cm^3$. The MWNTs can, for example, comprise from 5 to 15 sheets and more preferably from 7 to 10 sheets.

The carbon nanotubes are obtained in particular by chemical vapor deposition, for example according to the process described in the document WO 06/082325. Preferably, they are obtained from renewable starting material, in particular of plant origin, as described in the patent application EP 1 980 530.

These nanotubes may or may not be treated.

An example of crude carbon nanotubes is in particular the tradename Graphistrength® C100 from Arkema.

These nanotubes can be purified and/or treated (for example oxidized) and/or ground and/or functionalized.

The grinding of the nanotubes can in particular be carried out under cold conditions or under hot conditions and can be carried out according to the known techniques employed in devices such as ball, hammer, edge runner, knife or gas jet mills or any other grinding system capable of reducing the size of the entangled network of nanotubes. It is preferable for this grinding stage to be carried out according to a gas jet grinding technique and in particular in an air jet mill.

The crude or ground nanotubes can be purified by washing using a sulfuric acid solution, so as to free them from possible residual inorganic and metallic impurities, such as, for example, iron, originating from their preparation process. The weight ratio of the nanotubes to the sulfuric acid can in particular be between 1:2 and 1:3. The purification operation can furthermore be carried out at a temperature ranging from 90° C. to 120° C., for example for a period of time of 5 to 10 hours. This operation can advantageously be followed by stages in which the purified nanotubes are rinsed with water and dried. In an alternative form, the nanotubes can be purified by high-temperature heat treatment, typically at greater than 1000° C.

The oxidation of the nanotubes is advantageously carried out by bringing the latter into contact with a sodium hypochlorite solution including from 0.5% to 15% by weight of NaOCl and preferably from 1% to 10% by weight of NaOCl, for example in a weight ratio of the nanotubes to the sodium hypochlorite ranging from 1:0.1 to 1:1. The oxidation is advantageously carried out at a temperature of less than 60° C. and preferably at room temperature, for a period of time ranging from a few minutes to 24 hours. This oxidation operation can advantageously be followed by stages in which the oxidized nanotubes are filtered and/or centrifuged, washed and dried.

The functionalization of the nanotubes can be carried out by grafting reactive units, such as vinyl monomers, to the surface of the nanotubes.

Use is preferably made, in the present invention, of crude carbon nanotubes, that is to say nanotubes which are neither oxidized nor purified nor functionalized and which have not been subjected to any other chemical and/or heat treatment, which are optionally ground.

The carbon nanofibers which can be used as carbon-based nanofillers in the present invention are, like the carbon nanotubes, nanofilaments produced by chemical vapor deposition (or CVD) starting from a carbon-based source which is decomposed on a catalyst comprising a transition metal (Fe, Ni, Co, Cu), in the presence of hydrogen, at temperatures of 500° C. to 1200° C. However, these two carbon-based fillers differ in their structure as the carbon nanofibers consist of more or less organized graphite regions (or turbostratic stacks), the planes of which are inclined at variable angles with respect to the axis of the fiber. These stacks can take the form of platelets, fishbones or dishes stacked in order to form structures having a diameter generally ranging from 100 nm to 500 nm, indeed even more.

Examples of carbon nanofibers which can be used have in particular a diameter of 100 to 200 nm, for example of approximately 150 nm, and advantageously a length of 100 to 200 µm. Use may be made, for example, of the VGCF® nanofibers from Showa Denko.

Graphene denotes a flat, isolated and separate graphite sheet but also, by extension, an assemblage comprising between one and a few tens of sheets and exhibiting a flat or more or less wavy structure. This definition thus encompasses FLGs (Few Layer Graphene), NGPs (Nanosized Graphene Plates), CNSs (Carbon NanoSheets) and GNRs (Graphene NanoRibbons). On the other hand, it excludes carbon nanotubes and nanofibers, which respectively consist of the winding of one or more graphene sheets coaxially and of the turbostratic stacking of these sheets. Furthermore, it is preferable for the graphene used according to the invention not to be subjected to an additional stage of chemical oxidation or of functionalization.

The graphene used according to the invention is obtained by chemical vapor deposition or CVD, preferably according to a process using a pulverulent catalyst based on a mixed oxide. It is characteristically provided in the form of particles having a thickness of less than 50 nm, preferably of less than 15 nm, more preferentially of less than 5 nm, and having lateral dimensions of less than a micron, preferably from 10 nm to less than 1000 nm, more preferably from 50 to 600 nm, indeed even from 100 to 400 nm. Each of these particles generally includes from 1 to 50 sheets, preferably from 1 to 20 sheets and more preferably from 1 to 10 sheets, indeed even from 1 to 5 sheets, which are capable of being separated from one another in the form of independent sheets, for example during a treatment with ultrasound.

The Sulfur-Based Material

The sulfur-based material can be native sulfur, a sulfur-based organic compound or polymer, a sulfur-based inorganic compound or a mixture of these in all proportions.

Various sources of native sulfur are commercially available. The particle size of the sulfur powder can vary within wide limits. The sulfur can be used as is or the sulfur can be purified beforehand according to different techniques, such as refining, sublimation or precipitation. The sulfur or more generally the sulfur-based material can also be subjected to a preliminary stage of grinding and/or sieving in order to reduce the size of the particles and to narrow their distribution.

The sulfur-based inorganic compounds which can be used as sulfur-based materials are, for example, alkali metal anionic polysulfides, preferably the lithium polysulfides represented by the formula $Li_2S_n$ (with $n \geq 1$).

The sulfur-based organic compounds or polymers which can be used as sulfur-based materials can be chosen from organic polysulfides, organic polythiolates including, for example, functional groups, such as dithioacetal, dithioketal or trithioorthocarbonate, aromatic poly sulfides, polyether-polysulfides, salts of polysulfide acids, thiosulfonates [—S(O)$_2$—S—], thiosulfinates [—S(O)—S—], thiocarboxylates [—C(O)—S—], dithiocarboxylates [—RC(S)—S—], thiophosphates, thiophosphonates, thiocarbonates, organometallic polysulfides or their mixtures.

Examples of such organosulfur-based compounds are described in particular in the document WO 2013/155038.

According to a specific embodiment of the invention, the sulfur-based material is an aromatic polysulfide.

Aromatic polysulfides correspond to the following general formula (I):

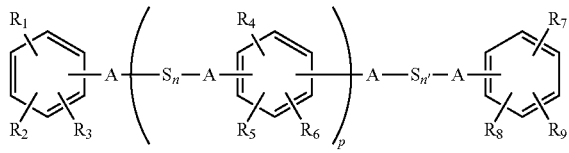

in which:
$R_1$ to $R_9$ represent, in identical or different fashion, a hydrogen atom, an —OH or —O$^-$M$^+$ radical, a saturated or unsaturated carbon-based chain comprising from 1 to 20 carbon atoms or an —OR$_{10}$ group, with it being possible for Rio to be an alkyl, arylalkyl, acyl, carboxyalkoxy, alkyl ether, silyl or alkylsilyl radical comprising from 1 to 20 carbon atoms, M represents an alkali metal or alkaline earth metal, n and n' are two integers which are identical or different, each being greater than or equal to 1 and less than or equal to 8, p is an integer between 0 and 50, and A is a nitrogen atom, a single bond or a saturated or unsaturated carbon-based chain of 1 to 20 carbon atoms.

Preferably, in the formula (I):
$R_1$, $R_4$ and $R_7$ are O$^-$M$^+$ radicals,
$R_2$, $R_5$ and $R_8$ are hydrogen atoms,
$R_3$, $R_6$ and $R_9$ are saturated or unsaturated carbon-based chains comprising from 1 to 20 carbon atoms, preferably from 3 to 5 carbon atoms,
the mean value of n and of n' is approximately 2,
the mean value of p is between 1 and 10, preferably between 3 and 8. (These mean values are calculated by a person skilled in the art from proton NMR data and by assaying the sulfur by weight),
A is a single bond connecting the sulfur atoms to the aromatic rings.

Such poly(alkylphenol) polysulfides of formula (I) are known and can be prepared, for example, in two stages:
1) reaction of sulfur monochloride or sulfur dichloride with an alkylphenol, at a temperature of between 100 and 200° C., according to the following reaction:

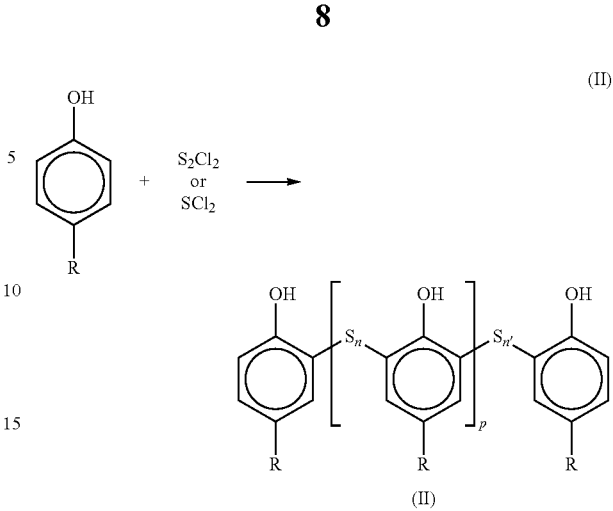

The compounds of formula (II) are in particular sold by Arkema under the name Vultac®.

2) reaction of the compound (II) with a metal derivative comprising the metal M, such as, for example, an oxide, a hydroxide, an alkoxide or a dialkylamide of this metal, in order to obtain O$^-$M$^+$ radicals.

According to a more preferred alternative form, R is a tert-butyl or tert-pentyl radical.

According to another preferred alternative form of the invention, use is made of a mixture of compounds of formula (I) in which 2 of the R radicals present on each aromatic unit are carbon-based chains comprising at least one tertiary carbon via which R is connected to the aromatic nucleus.

The Active Material

The amount of carbon-based nanofillers in the active material represents from 1% to 25% by weight, preferably from 10% to 15% by weight, for example from 12% to 14% by weight, with respect to the total weight of the active material.

The active material according to the invention is a finished product in the solid state comprising an intimate mixture of particles, the carbon-based nanofillers being dispersed in the body of the sulfur-based material and in a homogeneous way.

The active material advantageously exhibits a density of greater than 1.6 g/cm$^3$, determined according to the standard NF EN ISO 1183-1. The density is generally less than 2 g/cm$^3$.

It also advantageously exhibits a porosity of less than 40%, preferably a porosity of less than 20%. The porosity can be determined from the difference between the theoretical density and the measured density.

The electrode active material as defined according to the invention makes it possible to increase the specific capacity of the electrode, which is denser, and to increase the charge and discharge capacity of the electrode.

The homogeneous mixture of particles can subsequently be ground in order to obtain a powder not exhibiting particles with a size of greater than 100 μm, preferably not exhibiting particles with a size of greater than 50 μm, to facilitate the process of manufacture of the electrode.

The carbon-based nanofillers, such as CNTs, are mixed with the sulfur-based material, in particular with sulfur, preferably by the molten route. However, as the melting of the mixture is limited by the difference in density between the CNTs (0.1 g/cm$^3$) and the sulfur (2 g/cm$^3$), it is generally necessary to add intense mechanical energy in order to carry out this mixing, which can be between 0.05 kWh/kg and 1 kWh/kg of active material, preferably between 0.2 and 0.5 kWh/kg of active material. The carbon-based nanofillers are thus dispersed homogeneously throughout the body of the particles, and are not found solely at the surface of the sulfur-based particles, as described in the document FR 2 948 233.

In order to do this, use is preferably made of a compounding device, that is to say an appliance conventionally used in the plastics industry for the melt blending of thermoplastic polymers and additives for the purpose of producing composites.

The active material according to the invention can thus be prepared according to a process comprising the following stages:
 (a) the introduction, into a compounding device, of at least one sulfur-based material and of carbon-based nanofillers;
 (b) the melting of the sulfur-based material;
 (c) the kneading of the molten sulfur-based material and of the carbon-based nanofillers;
 (d) the recovery of the mixture obtained in an agglomerated solid physical form;
 (e) the grinding of the mixture in the powder form.

In a compounding appliance, the sulfur-based material and the carbon-based nanofillers are mixed using a high-shear device, for example a corotating twin-screw extruder or a co-kneader. The molten material generally exits from the appliance in an agglomerated solid physical form, for example in the form of granules, or in the form of rods which, after cooling, are cut up into granules.

Examples of co-kneaders which can be used are the Buss® MDK 46 co-kneaders and those of the Buss® MKS or MX series, sold by Buss AG, which all consist of a screw shaft provided with flights which is positioned in a heating barrel optionally consisting of several parts, the internal wall of which is provided with kneading teeth appropriate for interacting with the flights to produce shearing of the kneaded material. The shaft is driven in rotation and provided with an oscillating movement in the axial direction by a motor. These co-kneaders can be equipped with a system for manufacturing granules, for example attached to their outlet orifice, which can consist of an extrusion screw or of a pump.

The co-kneaders which can be used preferably have a screw ratio L/D ranging from 7 to 22, for example from 10 to 20, while the corotating extruders advantageously have an L/D ratio ranging from 15 to 56, for example from 20 to 50.

The compounding stage is carried out at a temperature greater than the melting point of the sulfur-based material. In the case of sulfur, the compounding temperature can range from 120° C. to 150° C. In the case of other types of sulfur-based material, the compounding temperature depends on the material specifically used, the melting point of which is generally mentioned by the supplier of the material. The residence time will also be adjusted to the nature of the sulfur-based material.

This process makes it possible to efficiently and homogeneously disperse a large amount of carbon-based nanofillers in the sulfur-based material, despite the difference in density between the constituents of the active material.

According to one embodiment of the invention, the active material additionally comprises at least one additive chosen from a rheology modifier, a binder, an ion conductor, a carbon-based electrical conductor, an electron-donating component or their combination. These additives are advantageously introduced during the compounding stage, so as to obtain a homogeneous active material.

In this embodiment, the sulfur-based material and the carbon-based nanofillers then represent from 20% to 100% by weight, preferably from 20% to 80% by weight, with respect to the total weight of the active material.

In particular, it is possible to add, during the mixing, during the compounding stage, an additive which modifies the rheology of the sulfur in the molten state, in order to reduce the self-heating of the mixture in the compounding device. Such additives having a fluidizing effect on the liquid sulfur are described in the application WO 2013/178930. Mention may be made, as examples, of dimethyl sulfide, diethyl sulfide, dipropyl sulfide, dibutyl sulfide, dimethyl disulfide, diethyl disulfide, dipropyl disulfide, dibutyl disulfide, their trisulfide homologs, their tetrasulfide homologs, their pentasulfide homologs or their hexasulfide homologs, alone or as mixtures of two or more of them in all proportions.

The amount of rheology-modifying additive is generally between 0.01% and 5% by weight, preferably from 0.1% to 3% by weight, with respect to the total weight of the active material.

The active material can comprise a binder, in particular a polymer binder, for example chosen from halogenated polymers, preferably fluorinated polymers, functional polyolefins, polyacrylonitriles, polyurethanes, polyacrylic acids and their derivatives, polyvinyl alcohols and polyethers, or a blend of these in all proportions.

Mention may be made, by way of examples of fluorinated polymers, of poly(vinylidene fluoride) (PVDF), preferably in the α form, poly(trifluoroethylene) (PVF3), polytetrafluoroethylene (PTFE), copolymers of vinylidene fluoride with either hexafluoropropylene (HFP) or trifluoroethylene (VF3) or tetrafluoroethylene (TFE) or chlorotrifluoroethylene (CTFE), fluoroethylene/propylene (FEP) copolymers, copolymers of ethylene with either fluoroethylene/propylene (FEP) or tetrafluoroethylene (TFE) or chlorotrifluoroethylene (CTFE), perfluoropropyl vinyl ether (PPVE), perfluoroethyl vinyl ether (PEVE), 2,3,3,3-tetrafluoropropene and copolymers of ethylene with perfluoromethyl vinyl ether (PMVE), or their blends.

Mention may be made, by way of examples of polyethers, of poly(alkylene oxide)s, such as poly(ethylene oxide)s PEOs, polyalkylene glycols, such as polyethylene glycols PEGs, polypropylene glycols PPGs, polytetramethylene glycols (PTMGs), polytetramethylene ether glycols (PTMEGs), and the like.

Preferably, the binder is PVDF or a PEO.

The active material can comprise an ion conductor having a favorable interaction with the surface of the sulfur-based material, in order to increase the ion conductivity of the active material. Mention may nonlimitingly be made, as examples of ion conductors, of lithium organic salts, for example lithium imidazolate salts, or lithium sulfites. Mention may also be made of poly(alkylene oxide)s, which, besides their role of binder, can contribute ion conductivity properties to the active material.

The active material can comprise an electrical conductor, advantageously a carbon-based electrical conductor, such as carbon black, graphite or graphene, generally in proportions which can range from 1% to 10%, with respect to the sulfur-based material. Preferably, carbon black is used as electrical conductor.

The active material can comprise an electron-donating component in order to improve the electron exchanges and to regulate the length of the polysulfides during charging, which optimizes the charge/discharge cycles of the battery.

Use may advantageously be made, as electron-donating components, of a component, in the powder form or in the salt form, from Groups IVa, Va and VIa of the Periodic Table, preferably chosen from Se, Te, Ge, Sn, Sb, Bi, Pb, Si or As.

The active material according to the invention is advantageously provided in the form of a powder comprising particles exhibiting a mean size of less than 150 μm, preferably of less than 100 μm, a median diameter $d_{50}$ of between 1 and 60 μm, preferably between 10 and 60 μm, more preferably between 20 and 50 μm, a median diameter $d_{90}$ of less than 100 μm, preferably a diameter $d_{100}$ of less than 50 μm, these characteristics being determined by laser diffraction.

In order to obtain this powder morphology, use is generally made of an appliance of hammer mill, pin mill or bead mill type, of an air jet mill or of other methods for the micronization of solid materials.

The active material according to the invention, preferably in the powder form as characterized above, and advantageously exhibiting a porosity of less than 20% and/or a density of greater than 1.6 g/cm$^3$, can be used to prepare a Li/S battery electrode; it generally represents of the order of 20% to 95% by weight, preferably of 35% to 80% by weight, with respect to the complete formulation of the electrode.

The invention will now be illustrated by the following examples, the objective of which is not to limit the scope of the invention, defined by the appended claims.

EXPERIMENTAL SECTION

Example 1: Preparation of a S/CNT Active Material

CNTs (Graphistrength® C100 from Arkema) and solid sulfur (50-800 μm) were introduced into the first feed hopper of a Buss® MDK 46 (L/D=11) co-kneader, equipped with a recovery extrusion screw and with a granulation device.

The set temperature values within the co-kneader were as follows: Zone 1: 140° C.; Zone 2: 130° C.; Screw: 120° C.

At the outlet of the die, the mixture consisting of 87.5% by weight of sulfur and 12.5% by weight of CNTs is in the form of granules obtained by pelletizing, cooled by air.

The granules were subsequently ground in a hammer mill, cooling being provided by nitrogen.

Observation with a scanning electron microscope (SEM) showed that the CNTs were well dispersed in the sulfur.

The granules were ground in a high-speed pin mill (12 000-14 000 rpm), cooling being carried out with liquid nitrogen at −30° C. introduced onto the granules in the feed screw of the mill. The powder was sieved using a cylindrical 80 μm screen. The distribution in the sizes of the particles, determined by laser diffraction on a Malvern-type apparatus, is illustrated in FIG. 1. The size of the largest particles is less than 100 μm and the median diameter $d_{50}$ is between 20 and 50 μm.

Figure 2:
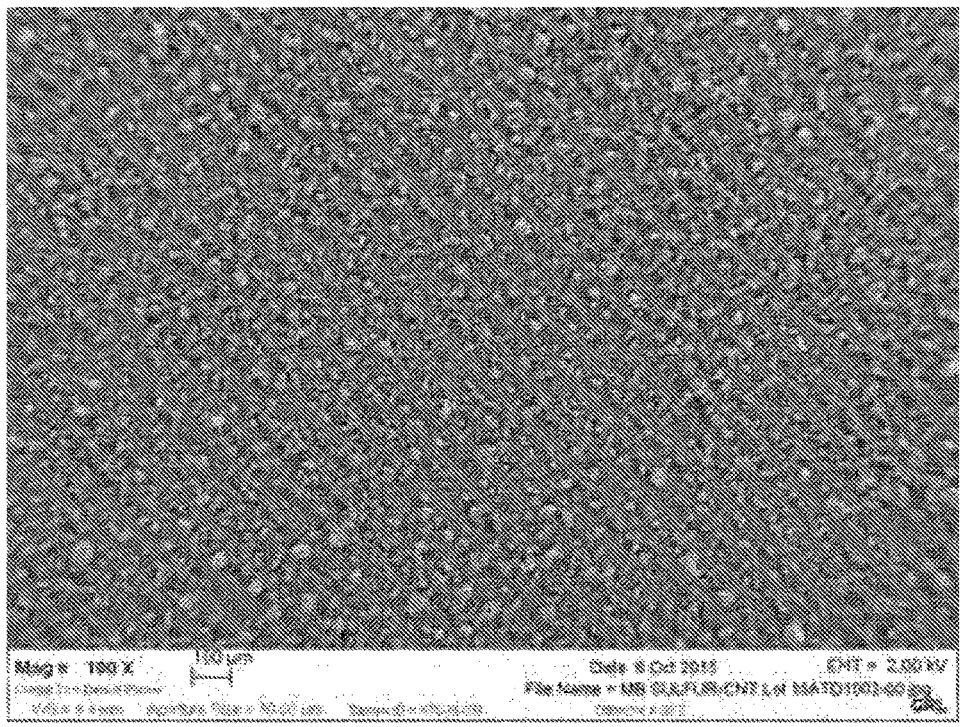
FIG. 2 illustrates, by SEM, the morphology of the electrode active material obtained in example 1 according to the invention.

The sieving of the powder was carried out in a second test using a cylindrical 50 μm screen. The distribution in the sizes of the particles indicates that the diameter $d_{100}$ is less than 50 μm. The morphology of the electrode active material thus obtained is illustrated in FIG. 2.

This powder, consisting of 87.5% by weight of sulfur and 12.5% by weight of CNTs, is an active material used in the preparation of an electrode for a Li/S battery.

Example 2: Preparation of a S/DMDS/CNT Active Material

CNTs (Graphistrength® C100 from Arkema) and solid sulfur (50-800 μm) were introduced into the first feed hopper of a Buss® MDK 46 (L/D=11) co-kneader, equipped with a recovery extrusion screw and with a granulation device.

Liquid dimethyl disulfide (DMDS) was injected into the 1$^{st}$ zone of the co-kneader.

The set temperature values within the co-kneader were as follows: Zone 1: 140° C.; Zone 2: 130° C.; Screw: 120° C.

At the outlet of the die, the masterbatch, consisting of 83% by weight of sulfur, 2% by weight of DMDS and 15% by weight of CNTs, is in the form of granules obtained by pelletizing, cooled by a water jet.

The granules obtained were dried down to a moisture content <100 ppm.

The dry granules were subsequently ground in a hammer mill, cooling being provided by nitrogen.

A powder exhibiting a median diameter $d_{50}$ of between 30 and 60 μm was obtained, which can be used in the preparation of an electrode for a Li/S battery.

Example 3: Preparation of a S/Poly(Tert-Butylphenol) Disulfide/CNT Active Material CNTs (Graphistrength® C100 from Arkema) and solid sulfur (50-800 μm) were introduced into the first feed hopper of a Buss® MDK 46 (L/D=11) co-kneader, equipped with a recovery extrusion screw and with a granulation device.

Liquid dimethyl disulfide (DMDS) was injected into the 1$^{st}$ zone of the co-kneader.

Poly(tert-butylphenol) disulfide, sold under the name Vultac-TB7® by Arkema, was premixed with a Li salt, sold under the name LOA (lithium 4,5-dicyano-2-(trifluoromethyl)imidazole) by Arkema, and then introduced into the first hopper using a 3$^{rd}$ metering device.

The set temperature values within the co-kneader were as follows: Zone 1: 140° C.; Zone 2: 130° C.; Screw: 120° C.

At the outlet of the die, the mixture is in the form of granules obtained by pelletizing, cooled by a water jet.

The granules obtained were dried down to a moisture content <100 ppm.

The dry granules were subsequently ground in a hammer mill, cooling being provided by nitrogen.

A powder consisting of 77% by weight of sulfur, 2% by weight of DMDS, 15% by weight of CNTs, 5% of Vultac-TB7® and 1% of LOA was obtained, which is used in the preparation of an electrode for a Li/S battery.

Example 4: Preparation of a S/POE/Li$_2$S/CNT Active Material

CNTs (Graphistrength® C100 from Arkema) and solid sulfur (50-800 μm) were introduced into the first feed hopper of a Buss® MDK 46 (L/D=11) co-kneader, equipped with a recovery extrusion screw and with a granulation device.

Polyethylene oxide POLYOX® WSR N-60K (produced by Dow) was premixed with Li$_2$S, supplied by Sigma. This mixture is introduced into the 1$^{st}$ hopper via the 3rd metering device.

The set temperature values within the co-kneader were as follows: Zone 1: 140° C.; Zone 2: 130° C.; Screw: 120° C.

At the outlet of the die, the mixture consisting, by weight, of 70% of sulfur, 15% of CNTs, 10% of Polyox® WSRN- 60K and 5% of Li$_2$S is in the form of granules obtained by the graduator of the rod, intersected by the conveyor belt without contact with water.

The dry granules were subsequently ground in a hammer mill, cooling being provided by nitrogen.

A powder consisting, by weight, of 70% of sulfur, 15% of CNTs, 10% of Polyox® WSR N-60K and 5% of Li$_2$S was obtained, which comprises particles exhibiting a mean size of less than 150 µm, a median diameter d$_{50}$ and d$_{90}$ which are suitable for the powder to be used as cathode active material for a Li/S battery.

Example 5: Evaluation of the Active Material

Active material evaluation tests were carried out in a Li/S battery model containing:
1) Anode made of Li metal, thickness 100 µm
2) Separator/membrane (20 µm)
3) Electrolyte based on sulfolane with 1M of Li$^+$
4) Cathode based on a sulfur-based formulation supported by a collector made of Al Two cathode formulations were tested:
reference formulation comprising, by weight, 70% of sulfur, 10% of carbon black and 20% of PEO (Polyox® WSR N-60K), representative of the prior art,
formulation comprising, by weight, 80% of active material of example 1, 5% of carbon black and 15% of PEO.

The cathode formulation was applied to the electrode via a paste in a solvent, followed by drying.

The capacity of the cathode of the test cell is between 1.5 and 3 mAh/cm$^2$.

The test cells were placed under charge/discharge conditions.

The performance of the cathode was evaluated after 150 cycles:
cathode prepared from the reference formulation: 78%, with respect to the initial capacity,
cathode prepared from the formulation comprising the active material according to the invention: 88%, with respect to the initial capacity.

These results confirm that the active material according to the invention, comprising carbon-based nanofillers, makes it possible to improve the lifetime and thus the effectiveness of a Li/S battery.

The invention claimed is:

1. An active material for the manufacture of an electrode, comprising:
a sulfur-based material; and
from 1 to 25% by weight of carbon-based nanofillers homogeneously dispersed in the sulfur-based material.

2. The active material as claimed in claim 1, wherein the carbon-based nanofillers are carbon-based fillers, the smallest dimension of which is between 0.1 and 200 nm, measured by light scattering.

3. The active material as claimed in claim 1, wherein the carbon-based nanofillers are selected from the group consisting of carbon nanotubes, carbon nanofibers, graphene and a mixture thereof in all proportions.

4. The active material as claimed in claim 1, wherein the sulfur-based material is a sulfur-donating sulfur-based compound selected from the group consisting of native sulfur, sulfur-based organic compounds or polymers, sulfur-based inorganic compounds, and mixtures thereof in all proportions.

5. The active material as claimed in claim 4, wherein the sulfur-based inorganic compounds comprise alkali metal anionic polysulfides.

6. The active material as claimed in claim 4, wherein the sulfur-based material is selected from the group consisting of organic polysulfides, organic polythiolates aromatic polysulfides, polyether-polysulfides, salts of polysulfide acids, thiosulfonates [—S(O)$_2$—S—], thiosulfinates [—S(O)—S—], thiocarboxylates [—C(O)—S—], dithiocarboxylates [—RC(S)—S—], thiophosphates, thiophosphonates, thiocarbonates, organometallic polysulfides and their mixtures.

7. The active material as claimed in claim 6, wherein the sulfur-based material comprises an aromatic polysulfide corresponding to the following general formula (I):

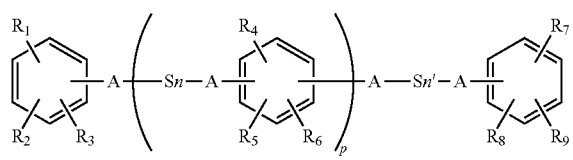

wherein:
R$_1$ to R$_9$ represent, in identical or different fashion, a hydrogen atom, an —OH or —O$^-$M$^+$ radical, a saturated or unsaturated carbon-based chain comprising from 1 to 20 carbon atoms or an —OR$_{10}$ group, with it being possible for Rio to be an alkyl, arylalkyl, acyl, carboxyalkoxy, alkyl ether, silyl or alkylsilyl radical comprising from 1 to 20 carbon atoms,
M represents an alkali metal or alkaline earth metal,
n and n' are two integers which are identical or different, each being greater than or equal to 1 and less than or equal to 8,
p is an integer between 0 and 50,
and A is a nitrogen atom, a single bond or a saturated or unsaturated carbon-based chain of 1 to 20 carbon atoms.

8. The active material as claimed in claim 1, wherein the sulfur-based material comprises at least native sulfur.

9. The active material as claimed in claim 1, further comprising at least one additive selected from the group consisting of a rheology modifier, a binder, an ion conductor, a carbon-based electrical conductor, an electron-donating component and combinations thereof.

10. The active material as claimed in claim 9, wherein the rheology modifier comprises dimethyl sulfide, diethyl sulfide, dipropyl sulfide, dibutyl sulfide, dimethyl disulfide, diethyl disulfide, dipropyl disulfide, dibutyl disulfide, their trisulfide homologs, their tetrasulfide homologs, their pentasulfide homologs, their hexasulfide homologs, alone and mixtures thereof in all proportions.

11. The active material as claimed in claim 9, wherein the binder is selected from the group consisting of halogenated polymers, functional polyolefins, and polyethers, or blends thereof in all proportions.

12. The active material as claimed in claim 9, wherein the binder is a fluorinated polymer selected from the group consisting of poly(vinylidene fluoride) (PVDF), poly(trifluoroethylene) (PVF3), polytetrafluoroethylene (PTFE), copolymers of vinylidene fluoride with either hexafluoropropylene (HFP) or trifluoroethylene (VF3) or tetrafluoroethylene (TFE) or chlorotrifluoroethylene (CTFE), fluoroethylene/propylene (FEP) copolymers, copolymers of ethylene with either fluoroethylene/propylene (FEP) or tetrafluoroethylene (TFE) or chlorotrifluoroethylene (CTFE), perfluoropropyl vinyl ether (PPVE), perfluoroethyl vinyl ether (PEVE), 2,3,3,3-tetrafluoropropene and copolymers of ethylene with perfluoromethyl vinyl ether (PMVE), or blends thereof.

13. The active material as claimed in claim 9, wherein the binder is a polyether selected from the group consisting of poly(alkylene oxide)s and polyalkylene glycols.

14. The active material as claimed in claim 9, wherein the ion conductor comprises a lithium organic salt, a lithium sulfite or a poly(alkylene oxide).

15. The active material as claimed in claim 9, wherein the carbon-based electrical conductor comprises carbon black, graphite or graphene.

16. The active material as claimed in claim 9, wherein the electron-donating component comprises a component, in the powder form or in the salt form, selected from the group consisting of Groups IVa, Va and VIa of the Periodic Table.

17. The active material as claimed in claim 1, wherein the sulfur-based material and the carbon-based nanofillers represent from 20% to 100% by weight, with respect to the total weight of the active material.

18. The active material as claimed in claim 1, wherein the active material is in the form of a powder comprising particles exhibiting a mean size of less than 150 μm, a median diameter $d_{50}$ of between 10 and 60 μm and a median diameter $d_{90}$ of less than 100 μm.

19. An electrode active material, comprising:
   a sulfur-based material; and
   from 1 to 25% by weight of carbon-based nanofillers homogeneously dispersed in the sulfur-based material,
   wherein the active material exhibits a porosity of less than 40%.

20. An electrode active material, comprising:
   a sulfur-based material; and
   from 1 to 25% by weight of carbon-based nanofillers homogeneously dispersed in the sulfur-based material,
   wherein the active material exhibits a density of greater than 1.6 g/cm$^3$.

* * * * *